(12) United States Patent
Mahmood

(10) Patent No.: US 8,040,812 B1
(45) Date of Patent: Oct. 18, 2011

(54) NETWORK OUTAGE ASSESSMENT

(75) Inventor: Muhammad Mahmood, Richmond, TX (US)

(73) Assignee: Sprint Communications Company L.P., Overland, KS (US)

( * ) Notice: Subject to any disclaimer, the term of this patent is extended or adjusted under 35 U.S.C. 154(b) by 171 days.

(21) Appl. No.: 12/435,855

(22) Filed: May 5, 2009

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. ............ 370/241.1; 370/242; 370/251; 455/423

(58) Field of Classification Search .......... 370/236, 370/236.2, 241.1, 242, 251; 398/10, 17; 455/423
See application file for complete search history.

(56) References Cited

U.S. PATENT DOCUMENTS

| 5,748,617 | A * | 5/1998 | McLain, Jr. ............... 370/244 |
| 5,761,502 | A * | 6/1998 | Jacobs ............................ 1/1 |
| 5,920,257 | A * | 7/1999 | Commerford ............ 340/506 |
| 6,731,741 | B1 * | 5/2004 | Fourcand et al. ........ 379/221.08 |
| 6,768,735 | B1 * | 7/2004 | Gammenthaler et al. .... 370/385 |
| 6,804,712 | B1 * | 10/2004 | Kracht ......................... 709/223 |
| 6,813,497 | B2 * | 11/2004 | Hutcheson et al. .......... 455/453 |
| 6,829,215 | B2 * | 12/2004 | Tornar ........................ 370/223 |
| 7,080,144 | B2 * | 7/2006 | Boehmke .................... 709/225 |
| 7,395,053 | B1 * | 7/2008 | Mak et al. ................. 455/414.1 |
| 7,480,713 | B2 * | 1/2009 | Ullman ........................ 709/224 |
| 2002/0173313 | A1 * | 11/2002 | Hutcheson et al. .......... 455/453 |
| 2007/0036083 | A1 * | 2/2007 | Wilson et al. .............. 370/242 |
| 2007/0076738 | A1 * | 4/2007 | Ludwig et al. .............. 370/431 |
| 2007/0294757 | A1 * | 12/2007 | Stephens et al. ............ 726/12 |
| 2008/0183339 | A1 * | 7/2008 | Vaswani et al. ............ 700/297 |
| 2009/0157529 | A1 * | 6/2009 | Ehlers et al. ................. 705/26 |
| 2010/0118712 | A1 * | 5/2010 | Wakumoto et al. .......... 370/248 |

* cited by examiner

*Primary Examiner* — Aung S Moe
*Assistant Examiner* — Benjamin H Elliott, IV

(57) ABSTRACT

A system is provided for network outage assessment. An outage tool retrieves a scheduled site list from a network management interface for a data network. The scheduled site list specifies sites associated with the network management interface that are scheduled to be active and sites that are scheduled to be inactive. The outage tool retrieves communication site lists from gateways associated with the network management interface. Each of the communication site lists is associated with a corresponding gateway and specifies sites that are in communication with the corresponding gateway. The outage tool identifies sites that are listed as the sites associated that are scheduled to be active and absent from the sites that are in communication with the corresponding gateway as a list of outage sites. The outage tool outputs outage site data based on the list of outage sites to the user interface to enable a management action.

20 Claims, 3 Drawing Sheets

NETWORK OUTAGE ASSESSMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A communication service provider may monitor a communication network to ensure that network components are functioning properly to provide service to customers. However, when a network outage occurs, the communication service provider may not be able to initially determine which individual components are not functioning properly due to the large number of network components and the relationships between these network components. The communication service provider may respond to network outages by sending a team of technicians to examine and work on network components in what is estimated to be the geographical vicinity of the outage. Such an examination and work process may require several hours before each of the network components that caused the outage can be identified and repaired.

SUMMARY

In some embodiments, a system is provided for network outage assessment. The system includes a processor, a user interface, and an outage tool. When executed by the processor, the outage tool retrieves a scheduled site list from a network management interface for a data network. The scheduled site list specifies sites associated with the network management interface that are scheduled to be active and sites associated with the network management interface that are scheduled to be inactive. The outage tool also retrieves communication site lists from gateways associated with the network management interface. Each of the communication site lists is associated with a corresponding gateway and specifies sites that are in communication with the corresponding gateway and sites that are lacking communication with the corresponding gateway. Additionally, the outage tool identifies a list of outage sites based on the sites that are scheduled to be active and absent from the sites that are in communication with the corresponding gateway. Furthermore, the outage tool outputs outage site data based on the list of outage sites to the user interface to enable a management action. The management action identifies a network element in a path of network elements from the network management interface to a site on the list of outage sites and/or a connection to the network element.

Some embodiments provide a method for network outage assessment. A network management interface is selected. A scheduled site list is retrieved from a selected network management interface for a dispatch network. The scheduled site list specifies sites associated with the selected network management interface that are scheduled to be active and sites associated with the selected network management interface that are scheduled to be inactive. Active master processors are identified that are associated with the selected network management interface. Communication site lists are retrieved from the active master processors. Each of the communication site lists is associated with a corresponding active master processor and specifies sites that are in communication with the corresponding active master processor and sites that are lacking communication with the corresponding active master processor. A list of outage sites is identified based on the sites that are scheduled to be active and absent from the sites that are in communication with the corresponding active master processor. Outage site data based on the list of outage sites is output to the user interface to enable a management action. The management action identifies a network element in a path of network elements from the network management interface to a site on the list of outage sites and/or a connection to the network element.

In some embodiments, a system is provided for network outage assessment. The system includes a processor, a user interface, and an outage tool. When executed by the processor, the outage tool retrieves a scheduled site list from a network management interface for a data network and a dispatch network. The scheduled site list specifies sites associated with the network management interface that are scheduled to be active and sites associated with the network management interface that are scheduled to be inactive. The outage tool also retrieves data communication site lists from gateways associated with the network management interface. Each of the data communication site lists is associated with a corresponding gateway and specifies sites that are in data communication with the corresponding gateway and sites that are lacking data communication with the corresponding gateway. Additionally, the outage tool retrieves dispatch communication site lists from master processors associated with the network management interface. Each of the dispatch communication site lists is associated with a corresponding master processor and specifies sites that are in dispatch communication with the corresponding master processor and sites that are lacking dispatch communication with the corresponding master processor. Furthermore, the outage tool identifies a list of outage sites based on the sites that are scheduled to be active and absent from the sites that are in data communication with the corresponding gateway and/or the sites that are in dispatch communication with the corresponding master processor. Moreover, the outage tool outputs outage site data based on the list of outage sites to the user interface to enable a management action. The management action identifies a network element in a path of network elements from the network management interface to a site on the list of outage sites and/or a connection to the network element.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
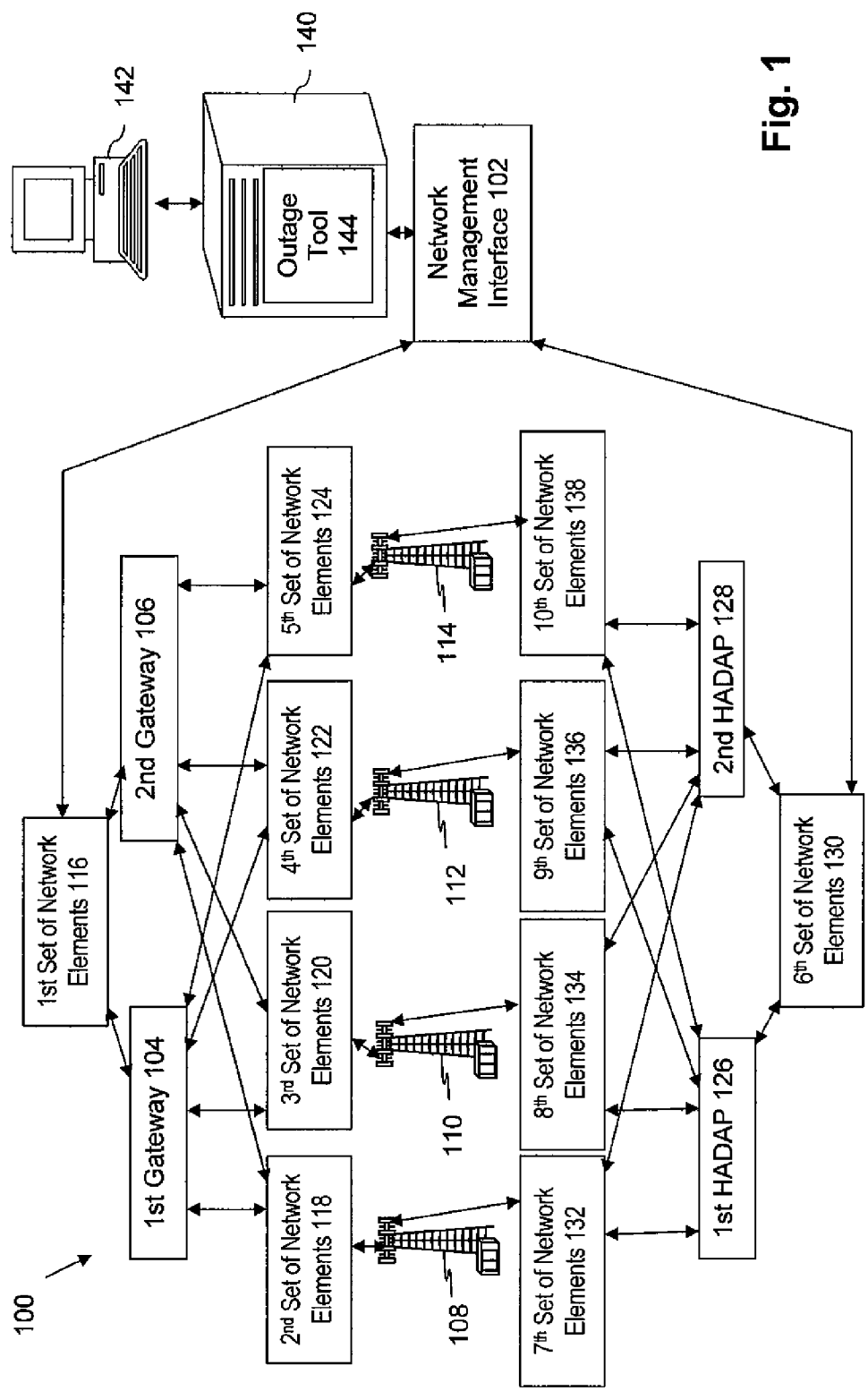
FIG. 1 shows a wireless communications system for network outage assessment according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A communication network may include a network management interface, such as an operation and maintenance console, which maintains a list of communication sites, such as a list of base transceiver stations (BTS), which transmit and receive customer communications. Although the list of communication sites may specify which sites are scheduled to be active and which sites are scheduled to be inactive, the list of sites does not identify which sites are communicating with customers and which sites are not communicating with customers because the network management interface may not have access to this site communication information. Therefore, when a network outage occurs, the communication service provider may not be able to initially determine which sites have lost communication with customers by accessing the network management interface.

A communication network may also include master processors that enable the communication sites to communicate with customers. A master processor is a computer that enables network communication via multiple network components. The master processors may be able to directly or indirectly identify which sites are communicating with customers and which sites are not communicating with customers. However, the master processors do not maintain information that specifies which sites are scheduled to be active and which sites are scheduled to be inactive. Therefore, when a network outage occurs, the communication service provider may not be able to initially determine which sites have lost communication with customers by accessing the master processors because the information from the master processors may identify many sites are not communicating with customers even though these sites are not scheduled to be active.

Embodiments provide systems and methods for network outage assessment. An outage tool retrieves a scheduled site list from a network management interface for a communication network. The scheduled site list specifies sites that are scheduled to be active and sites that are scheduled to be inactive. For example, an operation and maintenance console specifies that a $1^{st}$ BTS is scheduled to be inactive while a $2^{nd}$ BTS, a $3^{rd}$ BTS, and a $4^{th}$ BTS are scheduled to be active. The outage tool also retrieves communication site lists from master processors. Each of the communication site lists is associated with a corresponding master processor and specifies sites that are in communication with the corresponding master processor and sites that are not in communication with the corresponding master processor. For example, a $1^{st}$ gateway associated with a master processor maintains a communication site list that specifies that the $2^{nd}$ BTS and the $3^{rd}$ BTS are in communication with the $1^{st}$ gateway, while a $2^{nd}$ gateway associated with the master processor maintains a communication site list that specifies that the $3^{rd}$ BTS is in communication with the $2^{nd}$ gateway. Gateways that are associated with master processors may maintain communication site lists in some networks, while master processors may maintain communication site lists themselves in other networks.

The outage tool identifies outage sites based on sites that are scheduled to be active and are not in communication with a corresponding master processor. For example, even though the $1^{st}$ BTS is not communicating with the gateways, the $1^{st}$ BTS is not an outage site because the scheduled site list specifies that the $1^{st}$ BTS is scheduled to be inactive. The $2^{nd}$ BTS is an outage site, even though the $1^{st}$ gateway is communicating with the $2^{nd}$ BTS, because the $2^{nd}$ gateway is not communicating with the $2^{nd}$ BTS. The $3^{rd}$ BTS is not an outage site because both gateways are communicating with the $3^{rd}$ BTS. The $4^{th}$ BTS is an outage site because neither gateway is communicating with the $4^{th}$ BTS even though the scheduled site list specifies that the $4^{th}$ BTS is scheduled to be active.

The outage tool outputs outage site data based on the list of outage sites to the user interface to enable a management action. The management action identifies a network element in a path of network elements from the network management interface to a site on the list of outage sites and/or a connection to the network element. Continuing the previous example, because neither the $1^{st}$ gateway nor the $2^{nd}$ gateway is communicating with the $4^{th}$ BTS, an investigation of the outage for the $4^{th}$ BTS may initially identify the $4^{th}$ BTS and on network components that the outage site data identifies as shared by the $1^{st}$ gateway and the $2^{nd}$ gateway when communicating with the $4^{th}$ BTS. In contrast, the $2^{nd}$ BTS is communicating with the $1^{st}$ gateway but not communicating with the $2^{nd}$ gateway. Therefore, an investigation of the partial outage for the $2^{nd}$ BTS may initially identify network components and the connections between network components that the outage site data identifies in the network path from the $2^{nd}$ gateway to the $2^{nd}$ BTS. Based on the outage site data that specifies communication between the $1^{st}$ gateway and the $2^{nd}$ BTS, the investigation may not initially identify the $2^{nd}$ BTS or on any network components shared by the $1^{st}$ gateway and the $2^{nd}$ gateway to communicate with the $2^{nd}$ BTS because the $1^{st}$ gateway is communicating with the $2^{nd}$ BTS.

The outage tool may retrieve communication site lists from different technology networks that share communication sites to assess network outages. For example, while retrieving data communication site lists from gateways for a data communication network, the outage tool may retrieve dispatch communication site lists from master processors, such as highly available dispatch application processors (HADAPs), for a dispatch communication network. In some contexts herein, highly available may mean a computer having a special architecture that is suited for providing high service availability. For example, a pair of an active processor and a standby processor may provide service, such that a failure of the active processor results in a seamless transfer of control to the standby processor. In this example, instead of master processors indirectly maintaining the dispatch communication sites lists via gateways, the HADAPs directly maintain the dispatch communication site lists. Similar to the assessment of outages for the data network, the outage tool may identify sites as outage sites based on sites that are in dispatch communication with HADAPs in the dispatch communication network. Additionally, the outage tool may identify sites as outage sites based on sites that are in data communication with gateways in the data communication network and sites that are in dispatch communication with HADAPs in the dispatch communication network. For example, if the HADAPs in the dispatch communication network are in dispatch communication with the $2^{nd}$ BTS, the $3^{rd}$ BTS, and the $4^{th}$ BTS, and the gateways in the data communication network are not in data communication with the 4th BTS, then the management action initially identifies the network elements that enable data communication for the 4th BTS instead of initially identifying the 4th BTS. By combining information from the network management interface's schedule site list and the master processor's communication site lists, the output tool may enable investigations to be initiated of specific network components, connections to specific network components, and paths of network components in a matter of minutes, instead of the hours typically required. This quicker identification of specific network components that may be involved in an outage may result in reducing the time for network outages, which may increase customer satisfaction.

FIG. 1 shows a wireless communications system 100 that is suitable for implementing several embodiments of the disclosure. The wireless communication system 100 includes a network management interface 102, a 1st gateway 104, a 2nd gateway 106, a 1st site 108, a 2nd site 110, a 3rd site 112, a 4th site 114, a 1st set of network elements 116, a 2nd set of network elements 118, a 3rd set of network elements 120, a 4th set of network elements 122, and a 5th set of network elements 124. The gateways 104-106 may be mobile data gateways or vocoding interfaces. The components 104-124 may be part of a data communication network. The sites 108-114 may include BTS's and communication links with the BTS's. The sets of network elements 116-124 may include vocoding processor units, routers, repeaters, and relays.

The system 100 also includes a 1st HADAP 126, a 2nd HADAP 128, a 6th set of network elements 130, a 7th set of network elements 132, an 8th set of network elements 134, a 9th set of network elements 136, and a 10th set of network elements 138. The components 108-114 and 126-138 may be part of a dispatch communication network. A dispatch communication network may provide dispatch services that enable groups of mobile device users to communicate spontaneously as a group without needing to arrange a conference call. Each group member may carry a mobile device and may remain within a coverage area of the dispatch communication network to maintain communication with the group. The sets of network elements 130-138 may include vocoding processor units, routers, repeaters, relays, and other communication equipment.

Although the dispatch communication network and the data communication network depicted in FIG. 1 may be different technology networks, these networks may communicate with communication devices via the same sites 108-114, which may be base transceiver stations (BTS). The sites 108-114 may communicate with customer's communication devices by a standard wireless telephony protocol (such as code division multiple access (CDMA), global system for mobile communication (GSM), universal mobile telecommunications system (UMTS), integrated digital enhanced network (IDEN), and worldwide interoperability for microwave access (WiMAX)), a wireless internet connection, or some other means of wireless communication.

The network management interface 102 may communicate via the 1st set of network elements 116 with the 1st gateway 104 and the 2nd gateway 106. The 1st set of network elements 116 may include master processors used to communicate with the 1st gateway 104 and the 2nd gateway 106. The 1st gateway 104 and the 2nd gateway 106 may communicate via the 2nd set of network elements 118 with the 1st site 108, via the 3rd set of network elements 120 with the 2nd site 110, via the 4th set of network elements 122 with the 3rd site 112, and via the 5th set of network elements 124 with the 4th site 114. The gateways 104-106 may communicate with the sites 108-114 via a common set of elements or an exclusive set of elements. For example, the 1st site 108 may use some of the 2nd set of network elements 118 to exclusively communicate with the 1st gateway 104, some of the 2nd set of network elements 118 to exclusively communicate with the 2nd gateway 106, and some of the 2nd set of network elements 118 to communicate with both the 1st gateway 104 and the 2nd gateway 106.

The network management interface 102 may communicate via the 6th set of network elements 130 with the 1st HADAP 126 and the 2nd HADAP 128. The 1st HADAP 126 and the 2nd HADAP 128 may communicate via the 7th set of network elements 132 with the 1st site 108, via the 8th set of network elements 134 with the 2nd site 110, via the 9th set of network elements 136 with the 3rd site 112, and via the 10th set of network elements 138 with the 4th site 114. The HADAPs 126-128 may communicate with the sites 108-114 via a common set of elements or an exclusive set of elements. For example, the 1st site 108 may use some of the 7th set of network elements 132 to exclusively communicate with the 1st HADAP 126, some of the 7th set of network elements 132 to exclusively communicate with the 2nd HADAP 128, and some of the 7th set of network elements 132 to communicate with both the 1st HADAP 126 and the 2nd HADAP 128.

Additionally, the system 100 includes a server 140, a user interface 142, and an outage tool 144 that executes on the server 140. Although the user interface 142 is depicted as communicating directly with the server 140 that executes the outage tool 144, the user interface 142 may also communicate directly with any of the components 102-138. While various numbers of the components 102-144 are shown in FIG. 1, the system 100 may include any number of each of the components 102-144.

A user may use the user interface 142 to select a geographic location from a list of geographic locations that include network management interfaces, as each network may include many geographic locations that include network management interfaces. The outage tool 144 may identify the network management interface 102 in the geographic location that includes a scheduled site list for the geographic location. The outage tool 144 retrieves the scheduled site list from the network management interface 102 for a data communication network and/or a dispatch communication network. The scheduled site list specifies sites that are scheduled to be active and sites that are scheduled to be inactive in the geographic location. For example, an operation and maintenance console 102 specifies that a 1st BTS 108 is scheduled to be inactive while a 2nd BTS 110, a 3rd BTS 112, and a 4th BTS 114 are scheduled to be active. Sites that are scheduled to be inactive may be pre-cut sites or post-cut sites. A post-cut site is a site that has transitioned to an updated communication technology and a pre-cut site is a site that has yet to transition to the updated communication technology. Therefore, a site may be scheduled to be inactive because it has not yet transitioned to an updated communication technology, but a site may continue to be scheduled as inactive even after it has transitioned to the updated communication technology.

The outage tool 144 retrieves communication site lists from master processors using a different service access protocol than the service access protocol used to retrieve the schedule site list from the network management interface 102. For example, the outage tool 144 retrieves data communication site lists from the master processors in the 1st set of network elements 116 that communicate with the gateways 104-106 that maintain the data communication site lists for a data communication network. Each of the communication site lists is associated with a corresponding master processor and specifies sites that are in communication with the corresponding master processor and sites that are not in communication with the corresponding master processor. For example, the $1^{st}$ gateway 104 that is associated with a master processor in the $1^{st}$ set of network elements 116 maintains a data communication site list that specifies the $2^{nd}$ BTS 110 and the $3^{rd}$ BTS 112 are in data communication with the $1^{st}$ gateway 104. Continuing this example, the $2^{nd}$ gateway 106 that is associated with a master processor in the $1^{st}$ set of network elements 116 maintains a data communication list that specifies the $3^{rd}$ BTS 112 is in data communication with the $2^{nd}$ gateway 106. In another example, the $1^{st}$ HADAP 126 and the $2^{nd}$ HADAP 128 maintain dispatch communication lists that specify that the BTS's 110-114 are in dispatch communication with the $1^{st}$ HADAP 126 and the $2^{nd}$ HADAP 128.

The outage tool 144 identifies outage sites based on sites that are scheduled to be active and are not in communication with a corresponding master processor. The outage tool 144 matches the identifiers for the schedule site list and the identifiers for the sites that are not in communication with a corresponding master processor. The outage tool 144 matches the identifiers because the network management interface 102 and the master processors use different identifiers for the sites 108-114. For example, even though the $1^{st}$ BTS 108 is not communicating with the gateways 104-106 that are associated with a master processor in the $1^{st}$ set of network elements 116, the $1^{st}$ BTS 108 is not an outage site because the scheduled site list specifies that the $1^{st}$ BTS 108 is scheduled to be inactive. The $2^{nd}$ BTS 110 is an outage site, even though the $1^{st}$ gateway 104 that is associated with a master processor in the $1^{st}$ set of network elements 116 is communicating with the $2^{nd}$ BTS 110, because the $2^{nd}$ gateway 106 is not communicating with the $2^{nd}$ BTS 110. The $3^{rd}$ BTS 112 is not an outage site because both gateways 104-106 that are associated with a master processor in the $1^{st}$ set of network elements 116 are communicating with the $3^{rd}$ BTS 112. The $4^{th}$ BTS 114 is an outage site because neither of the gateways 104-106 that are associated with a master processor in the $1^{st}$ set of network elements 116 is communicating with the $4^{th}$ BTS 114 even though the scheduled site list specifies that the $4^{th}$ BTS 114 is scheduled to be active.

The outage tool 144 outputs outage site data based on the list of outage sites to the user interface 142 to enable a management action. The management action identifies a network element in a path of network elements from the network management interface to a site on the list of outage sites and/or a connection to the network element. Examples of management action include an investigation of a set of network elements that enable data communication for a BTS and a determination why a site that is scheduled to be inactive is communicating. Continuing the previous example, because neither the $1^{st}$ gateway 104 nor the $2^{nd}$ gateway 106 is communicating with the $4^{th}$ BTS 114, an investigation of the outage for the $4^{th}$ BTS 114 may initially identify the $4^{th}$ BTS 114 and on some of the $5^{th}$ set of network elements 124 that the outage site data identifies as shared by the $1^{st}$ gateway 104 and the $2^{nd}$ gateway 106 when communicating with the $4^{th}$ BTS 114. In contrast, the $2^{nd}$ BTS 110 is communicating with the $1^{st}$ gateway 104 but not communicating with the $2^{nd}$ gateway 106. Therefore, an investigation of the partial outage for the $2^{nd}$ BTS 110 may initially identify some of the $3^{rd}$ set of network elements 120 and the connections between some of the $3^{rd}$ set of network elements 120 that the outage site data identifies in the network path from the $2^{nd}$ gateway 106 to the $2^{nd}$ BTS 110. Based on the outage site data, the investigation initially may not identify the $2^{nd}$ BTS 110 or on any of the $3^{rd}$ set of network elements 120 shared by the $1^{st}$ gateway 104 and the $2^{nd}$ gateway 106 to communicate with the $2^{nd}$ BTS 110.

The outage tool 144 may retrieve communication site lists from different technology networks that share communication sites to assess network outages. For example, while retrieving data communication site lists from the gateways 104-106 for the data communication network, the outage tool 144 may retrieve dispatch communication site lists from the HADAP 126-128 for a dispatch communication network. A dispatch network may pair a standby HADAP with each active HADAP. Therefore, the outage tool 144 may identify the master processors that may be in communication with the sites 108-114 and the master processors that may be standby master processors by executing a script that checks hidden reports of the master processors to determine which of a pair of master processors is an active master processor and which of the pair of master processors is a standby master processor.

Similar to the assessment of the data communication network, the outage tool 144 may identify outage sites based on sites that are in dispatch communication with HADAPs in the dispatch communication network. Additionally, the outage tool 144 may identify outage sites based on sites that are in data communication with gateways in the data communication network and sites that are in dispatch communication with HADAPs in the dispatch communication network. The outage site data may specify how many of the communication site lists specify that a site is in communication with a corresponding gateway and/or master processor, and how many of the communication site lists specify that the site lacks communication with the corresponding gateway and/or master processor. For example, the HADAPs 126-128 in the dispatch communication network are in dispatch communication with the $2^{nd}$ BTS 110, the $3^{rd}$ BTS 112, and the $4^{th}$ BTS 114, and the gateways 104-106 in the data communication network are not in data communication with the $4^{th}$ BTS 114. The outage site data specifies that two of the HADAPs 126-128 are in dispatch communication with the $4^{th}$ BTS 114, and that zero of the gateways 104-106 are in data communication with the $4^{th}$ BTS 114. Based on this outage data, the investigation may initially identify the $5^{th}$ set of network elements 124 that enable data communication for the $4^{th}$ BTS 114 instead of initially identifying on the $4^{th}$ BTS 114. In another example, the outage site data specifies that one of the gateways 104-106 are in data communication with the $2^{nd}$ BTS 110, and that two of the HADAPs are in dispatch communication with the $2^{nd}$ BTS 110. Based on the outage site data, the investigation may not initially identify the $2^{nd}$ BTS 110 or on any of the $3^{rd}$ set of network elements 120 shared by the $1^{st}$ gateway 104 and the $2^{nd}$ gateway 106 to communicate with the $2^{nd}$ BTS 110.

The outage site data may identify a vocoding processing unit associated with a site on a list of outage sites. For example, the outage site data identifies a vocoding processing unit that is used by both the $1^{st}$ site 108 and the $2^{nd}$ site 110 for communicating in a data communication network, and both the $1^{st}$ site 108 and the $2^{nd}$ site 110 are not communicating with the corresponding master processors that are in the $1^{st}$ set of network elements 116 in the data communication network. Therefore, the initial investigation may identify the identified vocoding processing unit in the data communication network.

The outage site data may identify a path of network components from the network management interface 102 to a site on the list of outage sites. For example, if the $1^{st}$ gateway is not communicating with any of the sites 108-114, the outage site data may identify a path from the network management interface 102 to the $1^{st}$ set of network elements 116 to the $1^{st}$ gateway 104 to the sets of network elements 118-124 to the sites 108-114.

The outage site data may identify a common path of network components from one network component to another network component for sites on the list of outage sites. For example, if both of the gateways 104-106 are communicating with the 1$^{st}$ site 108, the 3$^{rd}$ site 112, and the 4$^{th}$ site 114, and neither of the gateways 104-106 are communicating with the 2$^{nd}$ site 110, then the outage site data may initiate an investigation based on an identified common path from the 3$^{rd}$ set of network elements 120 to the 2$^{nd}$ site 110.

The outage tool 144 may also identify outage sites based on sites that are in communication with a corresponding gateway and/or master processor and absent from the sites that are scheduled to be active. For example, if the 1$^{st}$ gateway 104 specifies that the 1$^{st}$ site 108 is in communication with the 1$^{st}$ gateway 104, but the scheduled site list specifies that the 1$^{st}$ site 108 is scheduled to be inactive, a management action may be taken to determine why a site that is scheduled to be inactive is communicating. By combining information from the scheduled site list of the network management interface 102 and the communication site lists of the corresponding master processors, the output tool 144 may enable investigations to be initiated of specific network components, connections to specific network components, and paths of network elements in a matter of minutes, instead of the hours typically required. This quicker identification of specific network components that may be involved in an outage may result in reducing the time for network outages, which may increase customer satisfaction. Quicker identification of specific network components that may be involved in an outage may also reduce expenses because crews may be sent out less frequently for on location diagnosis and repair.

Figure 2:
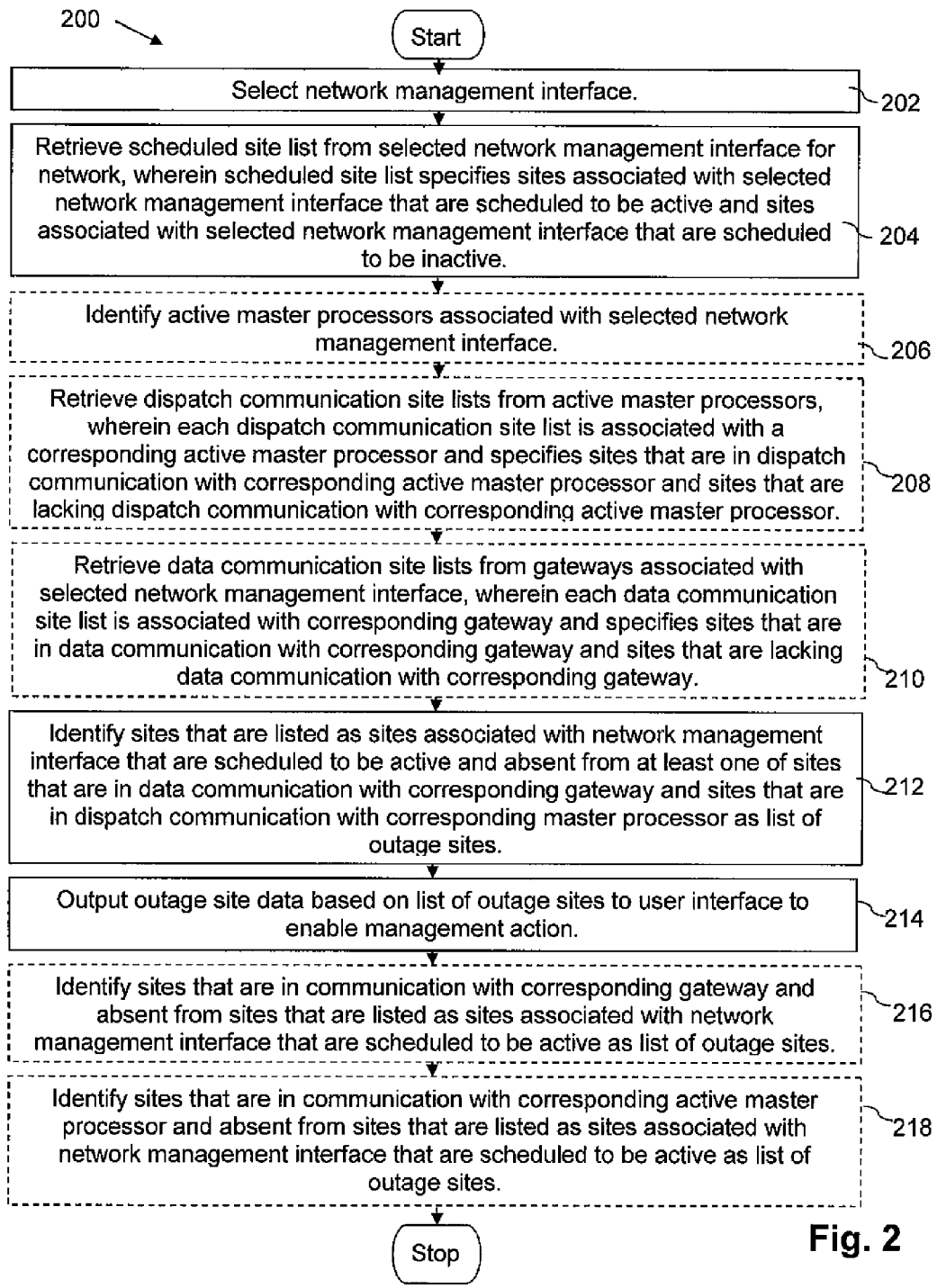
FIG. 2 shows a flowchart of a method for network outage assessment according to some embodiments of the present disclosure.

FIG. 2 is a flowchart illustrating a method 200 for network outage assessment according to some embodiments of the present disclosure. The method 200 may be executed to assess network outages for data and dispatch networks.

In box 202, a network management interface is selected. For example, the outage tool 144 selects the network management interface 102.

In box 204, a scheduled site list is retrieved from a selected network management interface for a network, wherein the scheduled site list specifies sites associated with the selected network management interface that are scheduled to be active and sites associated with the selected network management interface that are scheduled to be inactive. For example, the outage tool 144 retrieves a scheduled site list from the network management interface 102 for a data network that includes the network components 104-124 and a dispatch network that includes the network components 108-114 and 126-138.

In box 206, active master processors associated with the selected network management interface are optionally identified. For example, the outage tool 144 identifies the HDAPs 126-128 in the dispatch communication network that includes the components 108-114 and 126-138.

In box 208, dispatch communication site lists are optionally retrieved from the active master processors, wherein each dispatch communication site list is associated with a corresponding active master processor and specifies sites that are in dispatch communication with the corresponding active master processor and sites that are lacking dispatch communication with the corresponding active master processor. For example, the outage tool 144 retrieves dispatch communication site lists from the HDAPs 126-128.

In box 210, data communication site lists are optionally retrieved from gateways associated with the selected network management interface, wherein each data communication site list is associated with a corresponding gateway and specifies sites that are in data communication with the corresponding gateway and sites that are lacking data communication with the corresponding gateway. For example, the outage tool 144 retrieves data communication site lists from the gateways 104-106 that are associated with a master processor in the 1$^{st}$ set of network elements 116.

In box 212, outage sites are identified based on the sites associated with the network management interface that are scheduled to be active and absent from the sites that are in data communication with the corresponding gateway and/or the sites that are in dispatch communication with the corresponding master processor. For example, the outage tool 144 identifies a list of outages sites based on the sites that are scheduled to be active and not in data communication with the corresponding gateways 104-106 and/or not in dispatch communication with the corresponding HDAPs 126-128.

In box 214, outage site data based on the list of outage sites is output to a user interface to enable a management action. For example, the outage tool 144 outputs outage site data that initiates an investigation of the 5$^{th}$ set of network elements 124 that enable data communication for the 4$^{th}$ BTS 114.

In box 216, sites that are in communication with the corresponding gateway and absent from sites that are listed as sites associated with the network management interface that are scheduled to be active are optionally identified as the list of outage sites. For example, the outage tool 144 outputs outage site data that specifies that the BTS 108 is in communication with the 1$^{st}$ gateway 104 even though the 1$^{st}$ BTS is scheduled to be inactive.

In box 218, sites that are in communication with the corresponding active master processor and absent from sites that are listed as sites associated with the network management interface that are scheduled to be active are optionally identified as a list of outage sites. For example, the outage tool 144 outputs outage site data that specifies that the BTS 108 is in communication with the 1$^{st}$ HDAP 126 even though the 1$^{st}$ BTS is scheduled to be inactive.

Figure 3:
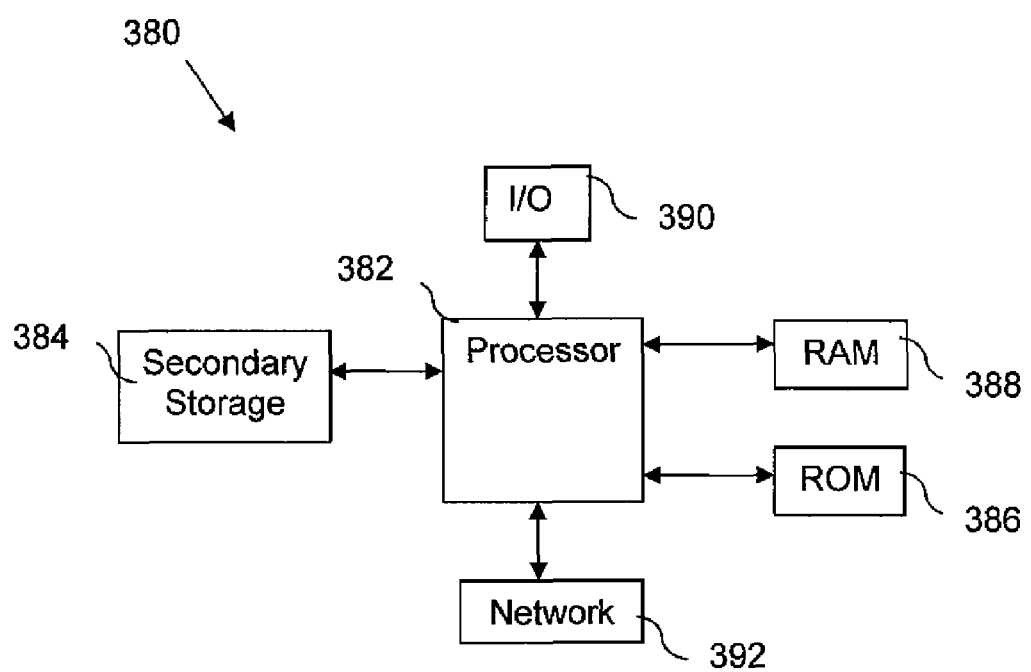
FIG. 3 illustrates an exemplary computer system suitable for implementing the several embodiments of the disclosure.

Some aspects of the system described above may be implemented on a computer with sufficient processing power, memory resources, and network throughput capability to handle the necessary workload placed upon it. FIG. 3 illustrates a typical computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 382 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382, for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example, optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 392 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for network outage assessment, comprising:
a processor;
a user interface; and
an outage tool that, when executed by the processor,
retrieves a scheduled site list from a network management interface for a data network, wherein the scheduled site list specifies sites associated with the network management interface that are scheduled to be active and sites associated with the network management interface that are scheduled to be inactive,
retrieves a plurality of communication site lists from a plurality of gateways associated with the network management interface, wherein each of the plurality of communication site lists is associated with a corresponding one of the plurality of gateways and specifies sites that are in communication with the corresponding one of the plurality of gateways and sites that are lacking communication with the corresponding one of the plurality of gateways,
identifies a list of outage sites based on sites that are listed, in the scheduled site list, as the sites associated with the network management interface that are scheduled to be active and based on sites that are absent from the sites that are listed, in the communication site lists, as being in communication with the corresponding one of the plurality of gateways, and
outputs outage site data based on the list of outage sites to the user interface to enable a management action, wherein the management action identifies at least one of a network element in a path of network elements from the network management interface to a site on the list of outage sites and a connection to the network element.

2. The system of claim 1, wherein the user interface is associated with one of the processor and a network component.

3. The system of claim 1, wherein the network management interface is an operation and maintenance console.

4. The system of claim 1, wherein the sites associated with the network management interface comprise base transceiver stations.

5. The system of claim 1, wherein the sites associated with the network management interface that are scheduled to be inactive, in the scheduled site list, are scheduled to be one of pre-cut and post-cut.

6. The system of claim 1, wherein the plurality of gateways is at least one of a plurality of mobile data gateways and a plurality of vocoding interfaces.

7. The system of claim 1, wherein the outage tool further identifies the list of outage sites based on sites that are listed, in the communication site lists, as being in communication with the corresponding one of the plurality of gateways and based on sites that are listed, in the scheduled site list, as the sites associated with the network management interface that are scheduled to be inactive.

8. The system of claim 1, wherein the outage site data specifies a number of the plurality of communication site lists that specifies a site is in communication with the corresponding one of the plurality of gateways and a number of the plurality of communication site lists that specifies the site lacks communication with the corresponding one of the plurality of gateways.

9. A computer implemented method for network outage assessment, comprising:
selecting a network management interface;
retrieving a scheduled site list from a selected network management interface for a dispatch network, wherein the scheduled site list specifies sites associated with the selected network management interface that are scheduled to be active and sites associated with the selected network management interface that are scheduled to be inactive;
identifying a plurality of active master processors associated with the selected network management interface;
retrieving a plurality of communication site lists from the plurality of active master processors, wherein each of the plurality of communication site lists is associated with a corresponding one of the plurality of active master processors and specifies sites that are in communication with the corresponding one of the plurality of active master processors and sites that are lacking communication with the corresponding one of the plurality of active master processors;
identifying a list of outage sites based on sites that are listed, in the scheduled site list, as the sites associated with the network management interface that are scheduled to be active and based on sites that are absent from the sites that are listed, in the communication site lists, as being in communication with the corresponding one of the plurality of active master processors; and
outputting outage site data based on the list of outage sites to a user interface to enable a management action, wherein the management action identifies at least one of a network element in a path of network elements from the network management interface to a site on the list of outage sites and a connection to the network element.

10. The computer implemented method of claim 9, wherein the plurality of active master processors is a plurality of highly available dispatch application processors.

11. The computer implemented method of claim 9, wherein identifying the plurality of active master processors associated with the selected network management interface comprises determining which of a pair of master processors is an active master processor and which of the pair of master processors is a standby master processor.

12. The computer implemented method of claim 9, further comprising identifying the list of outage sites based on sites that are listed, in the communication site lists, as being in communication with the corresponding one of the plurality of active master processors and based on sites that are listed, in the scheduled site list, as the sites associated with the network management interface that are scheduled to be inactive.

13. The computer implemented method of claim 9, wherein the outage site data specifies a number of the plurality of communication site lists that specifies a site is in communication with the corresponding one of the plurality of master processors and a number of the plurality of communication site lists that specifies the site lacks communication with the corresponding one of the plurality of master processors.

14. A system for network outage assessment, comprising:
a processor;
a user interface; and
an outage tool that, when executed by the processor,
retrieves a scheduled site list from a network management interface for a data network and a dispatch network, wherein the scheduled site list specifies sites associated with the network management interface that are scheduled to be active and sites associated with the network management interface that are scheduled to be inactive,
retrieves a plurality of data communication site lists from a plurality of gateways associated with the network management interface, wherein each of the plurality of data communication site lists is associated with a corresponding one of the plurality of gateways and specifies sites that are in data communication with the corresponding one of the plurality of gateways and sites that are lacking data communication with the corresponding one of the plurality of gateways,
retrieves a plurality of dispatch communication site lists from a plurality of master processors associated with the network management interface, wherein each of the plurality of dispatch communication site lists is associated with a corresponding one of the plurality of master processors and specifies sites that are in dispatch communication with the corresponding one of the plurality of master processors and sites that are lacking dispatch communication with the corresponding one of the plurality of master processors,
identifies a list of outage sites based on sites that are listed, in the scheduled site list, as the sites associated with the network management interface that are scheduled to be active and based on sites that are absent from at least one of the sites that are listed, in the data communication site lists, as being in data communication with the corresponding one of the plurality of gateways and based on sites that are absent from at least one of the sites that are listed, in the dispatch communication site lists, as being the sites that are in dispatch communication with the corresponding one of the plurality of master processors as a list of outage sites, and
outputs outage site data based on the list of outage sites to the user interface to enable a management action, wherein the management action identifies at least one of a network element in a path of network elements from the network management interface to a site on the list of outage sites and a connection to the network element.

15. The system of claim 14, wherein the outage site data identifies a path of network components from the network management interface to a site on the list of outage sites.

16. The system of claim 15, wherein the network components comprise at least one of a vocoding processor unit and a router.

17. The system of claim 14, wherein the outage site data identifies a vocoding processing unit associated with a site on the list of outage sites.

18. The system of claim 14, wherein the outage site data identifies at least one of a common path of network components from one network component to another network component for a plurality of sites on the list of outage sites and a common network component for a plurality of sites on the list of outage sites.

19. The system of claim 14, wherein the list of outage sites is based on sites that are listed, in the scheduled site list, as the sites associated with the network management interface that are scheduled to be active, based on sites that are absent from the sites that are listed, in the data communications site lists, as being in data communication with the corresponding one of the plurality of gateways, and based on sites that are present among the sites that are listed, in the dispatch communications site lists, as being in dispatch communication with the corresponding one of the plurality of master processors, and the management action identifies at least one of a network element in a path of network elements from the network management interface to a site listed, in the list of outage sites, and a connection to the network element.

20. The system of claim 14, wherein the list of outage sites is based on sites that are listed, in the scheduled site list, as the sites associated with the network management interface that are scheduled to be active, based on sites that are present among the sites that are listed, in the data communications site lists, as being in data communication with the corresponding one of the plurality of gateways, and based on sites that are absent from the sites that are listed, in the dispatch communications site lists, as being in dispatch communication with the corresponding one of the plurality of master processors as a list of outage cites, and the management action identifies at least one of a network element in a path of network elements from the network management interface to a site listed, in the list of outage sites, and a connection to the network element.

* * * * *